United States Patent [19]
Chamberlin et al.

[11] Patent Number: 5,284,246
[45] Date of Patent: Feb. 8, 1994

[54] SUPPORT FOR TAPE PANCAKES

[75] Inventor: Davis W. Chamberlin, Gerald J. Niles, both of St. Paul, Minn.

[73] Assignee: Minnesota Mining and Manufacturing Company, St. Paul, Minn.

[21] Appl. No.: 915,119

[22] Filed: Jul. 17, 1992

[51] Int. Cl.⁵ .............................................. B65D 85/62
[52] U.S. Cl. .................... 206/394; 206/395; 206/303
[58] Field of Search .............. 206/394, 391, 395, 303, 206/397

[56] References Cited

U.S. PATENT DOCUMENTS

| | | | |
|---|---|---|---|
| 4,124,173 | 11/1978 | Damour | 242/72 B |
| 4,516,786 | 5/1985 | Lund | 279/2 R |
| 4,708,246 | 11/1987 | Minion | 206/394 |
| 4,730,779 | 3/1988 | Thievessen | 242/72 R |
| 4,883,178 | 11/1989 | Thiele et al. | 206/391 |
| 4,955,471 | 9/1990 | Hirose et al. | 206/303 |
| 5,094,346 | 3/1992 | Sommerfeldt et al. | 206/394 |

FOREIGN PATENT DOCUMENTS

| | | | |
|---|---|---|---|
| 0064166b1 | 3/1286 | European Pat. Off. | |
| 296689 | 12/1990 | Japan | 206/394 |
| 1121765 | 7/1968 | United Kingdom | 206/397 |
| 2160509 | 12/1985 | United Kingdom | 206/303 |

Primary Examiner—William I. Price
Attorney, Agent, or Firm—Gary L. Griswold; Walter N. Kirn; Charles D. Levine

[57] ABSTRACT

A system securing a plurality of tape pancakes includes a compressible baffled core support on which the pancakes can be mounted. An interior rod having a head fits and is received within the baffled core support. A nub on the inside surface of the core support engages a groove on the outside surface of the interior rod to provide a threaded engagement between the interior rod and the core support. Rotation of the interior rod within the core support after the head contacts the end of the core support provides an axial compression load onto the core support to hold together the pancakes. This axial compression also expands the baffles which contact and tighten against the inside of the tape pancake cores and provide a radial force to secure the pancakes in place.

15 Claims, 5 Drawing Sheets

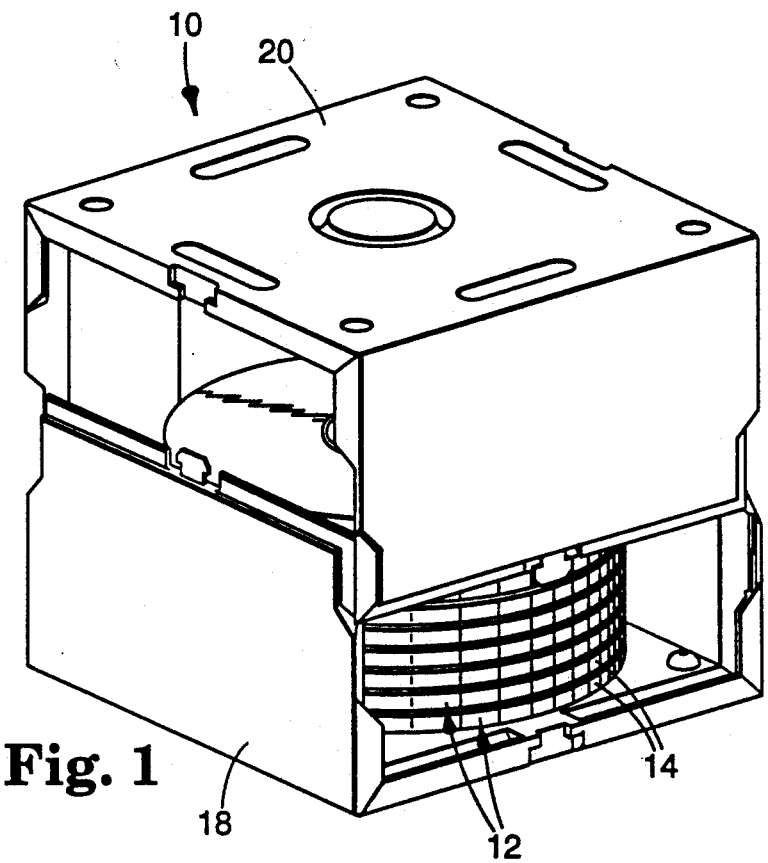
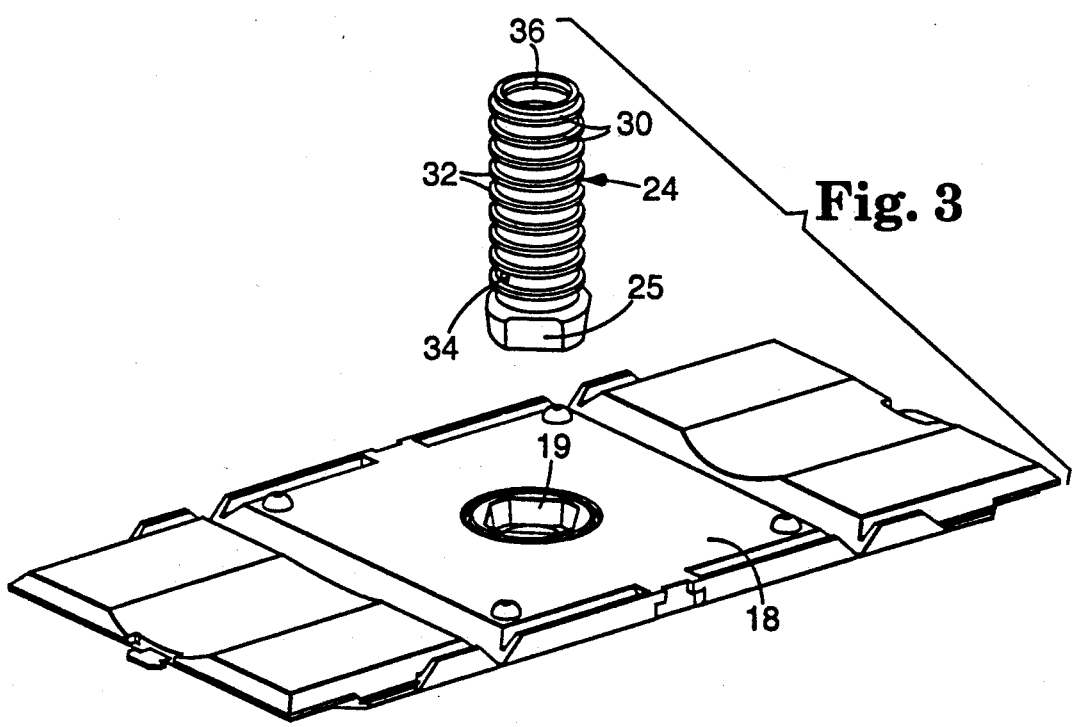

SUPPORT FOR TAPE PANCAKES

TECHNICAL FIELD

The present invention relates to storage and shipping containers. More particularly, the present invention relates to mandrels for tape pancakes which are used in storage and shipping containers.

BACKGROUND OF THE INVENTION

In producing magnetic recording media, there is a recurring need to transport large quantities of recording tape from the point of tape manufacture to other locations for final loading into cassettes, cartridges, or other carriers. It is common to transport the tape in the form of relatively large rolls, called "pancakes." A pancake of 1.27 cm (0.5 in) wide tape is typically wound on a hollow annular core having an outer diameter of 11.4 cm (4.5 in), and a width of 1.8 cm (0.7 in), slightly larger than the width of the tape. The outer diameter of the pancakes is typically about 35.6–40.7 cm (14–16 in). Shipping these tape pancakes over long distances under conditions of mechanical shock and vibration requires that they be well supported.

One primary form of damage to pancakes is axial shifting of the layers of tape relative to the pancake such that the pancake is no longer flat. This shifting, called core drop, hub drop, popped strands, or tape shift, can be caused by a stack of pancakes being dropped on a hard floor or being transported over rough or bumpy surfaces. Other problems and damage caused with known pancake containers include the offsetting of a portion of the pancake, called "upset," rotation of the core relative to the pancake, and transfer of cushion adhesive to the tape.

While effective protection of the tape in the pancake stacks is essential, the magnetic tape market is very price-competitive. Thus, protective packaging must be low cost, both in the packaging material itself, and in the labor required to apply and remove the packaging. It is also desirable to minimize the amount of packaging waste material which is discarded.

Known methods of protecting pancakes during shipping generally involve sliding several pancakes over a shaft or hollow tube, placing resilient spacers between each pancake, and placing a solid end plate on the top and bottom of the stack. The stack can be held together by shrink wrap film, as disclosed in U.S. Pat. No. 4,955,471.

U.S. Pat. No. 4,883,178 eliminates shrink wrap and discloses holding a pancake stack together with a threaded member running coaxially along the center of the stack, and a nut which tightens on an end plate. The compression is created by the threaded member being disposed within the pancake cores.

U.S. Pat. No. 4,708,246 discloses spacers and other packaging features which improve compression control. However, sometimes spacers move during shipping and can generate debris. Also, some spacer materials can create static which attracts debris to the pancakes.

Radially expanding mandrels are also known. U.S. Pat. No. 4,124,173 discloses an inflatable tube inside of an expandable mandrel. Cam mechanisms which press cylinder segments outwardly when a central shaft rotates relative to the outer segments are also known. U.S. Pat. No. 4,516,786 discloses a rotatable core chuck and U.S. Pat. No. 4,730,779 disclose an expanding assembly for a web-coiling core.

U.S. Pat. No. 5,094,346 assigned to Minnesota Mining and Manufacturing Company stacks pancakes on a mandrel within a container. The mandrel could radially expand to secure the pancakes and/or the pancakes could be secured by axial pressure.

SUMMARY OF THE INVENTION

A system for securing a plurality of tape pancakes includes a compressible baffled core support on which the pancakes articles can be mounted. This system is mountable in a container. An interior rod fits and is received within the baffled core support, and has a head which engages the free end of the baffled core support. A nub on the inside surface of the core support engages a groove on the outside surface of the interior rod to provide a threaded engagement between the interior rod and the core support. Rotation of the interior rod within the core support after the nub engages the groove, moves the interior rod toward the pancake stack. Further rotation after the head of the interior rod contacts the end of the core support provides an axial compression load onto the core support and therefore onto the pancake cores to hold together the pancakes. This axial compression expands the baffles. As the baffles expand they contact and tighten against the inside of the tape pancake cores and provide a radial force to secure the pancakes in place.

The head on the end of the interior rod has an outer diameter greater than the outer diameter of the baffled core support to contact and secure the articles. The baffle dimensions are selected to permit two pancakes to share a baffle peak when the pancakes are mounted on the baffled core support such that each baffle peak will support two adjacent pancakes.

BRIEF DESCRIPTION OF THE DRAWINGS

FIG. 1 is a perspective view of a container having the support of the present invention.

FIG. 3 is a perspective view of the baffled core support of FIG. 2 with a container base.

DETAILED DESCRIPTION OF PREFERRED EMBODIMENT

Figure 2:
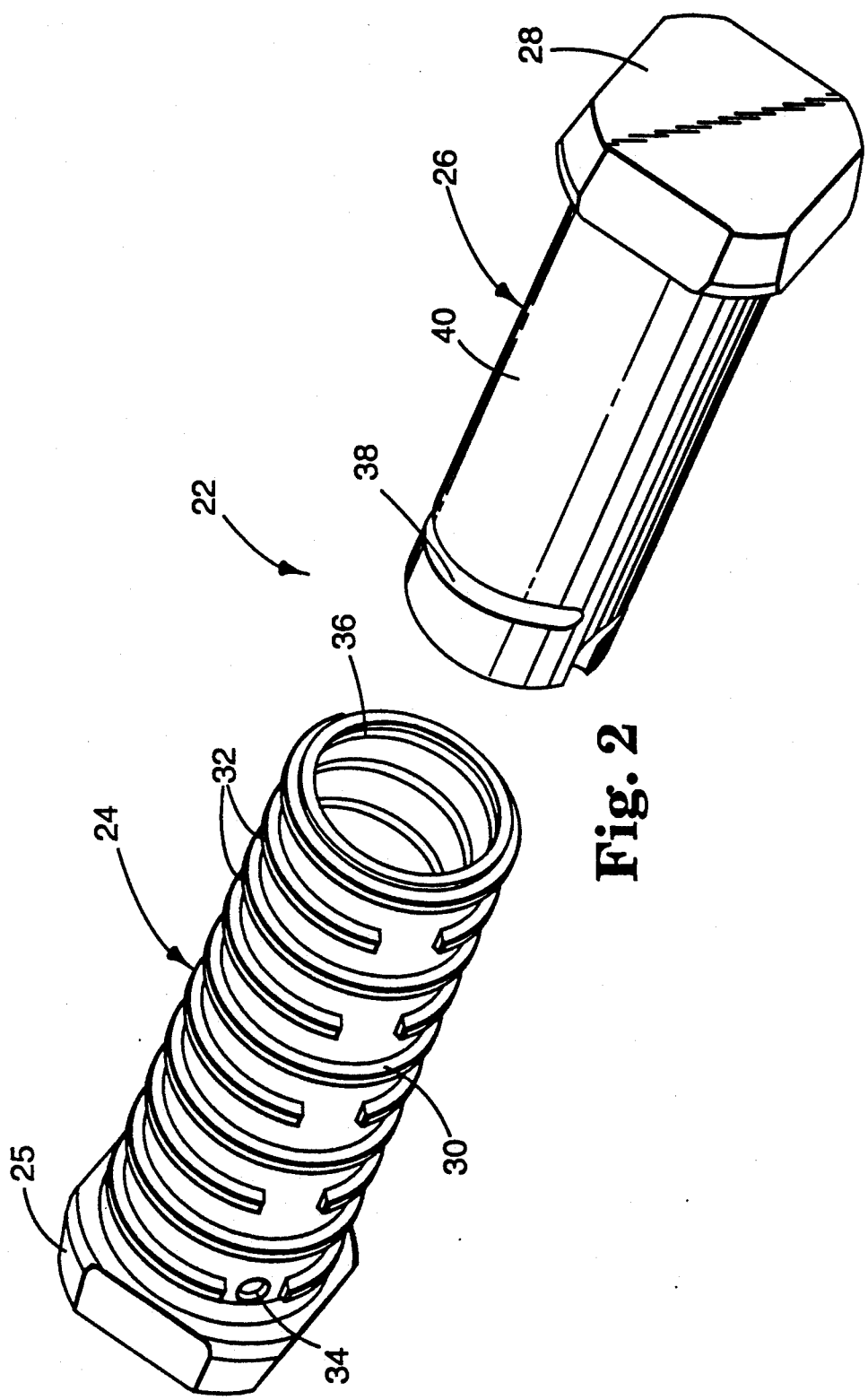
FIG. 2 is a perspective view of a support according to the present invention before assembly.

FIGS. 1–5 illustrate a container 10 used for pancakes 12 of recording tape, each of which includes a quantity of tape 14 wound around a flangeless hub or core 16 which extends approximately 0.25 cm (0.1 in) on each side of the tape 14. The container 10 includes a base 18, a cover 20 which combines with the base 18 to enclose the pancakes 12, and a support 22 extending from the base 18 on which a plurality of pancakes 12 can be placed.

A thin spacer can be disposed between adjacent pancakes 12 on each support 22 to prevent the adjacent cores from contacting each other and to prevent "hub dusting" which creates debris. End pads or bushings can be placed on the walls of the base 18 to space the pancakes 12 from the wall, maintain constant axial pressure on the pancakes 12, and prevent damage to the adjacent pancake due to contact with the wall if the wall bows and contacts the pancake 12 nonuniformly. The peripheral edges of the pancakes 12 are completely exposed to allow them to be grasped symmetrically to reduce the effort needed to remove the pancakes 12 from the support 22. This reduces the risk of damage to the pancakes 12 and injury to workers.

The support 22, shown in FIG. 2, is part of a system which secures a plurality of disk-shaped articles having a central opening, such as tape pancakes. The support 22 can be made of material having a suitable strength-to-weight ratio such as any strong, lightweight material such as high density polyethylene or rigid polyvinyl chloride without high lubricity to enable frictional locking of the pancakes.

Figure 4:
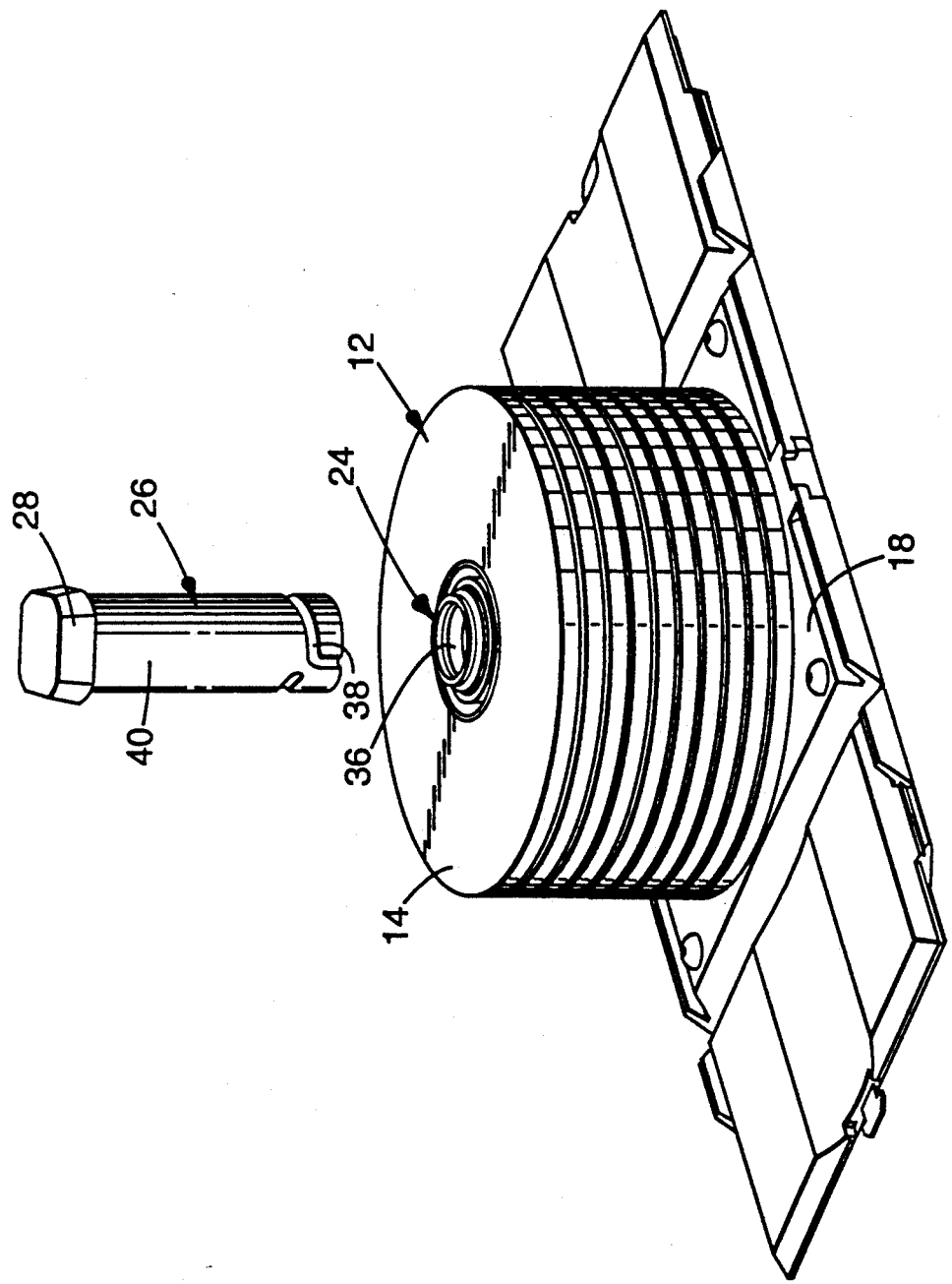
FIG. 4 is a perspective view of the interior rod of FIG. 2 with a container base loaded with tape pancakes.
Figure 5:
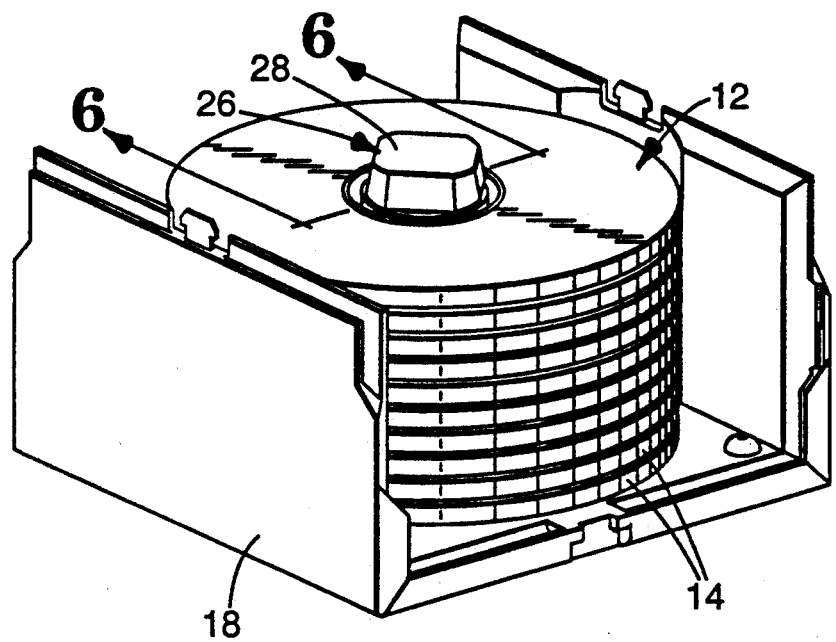
FIG. 5 is a perspective view of the support of FIG. 2 mounted in a container base loaded with tape pancakes.
Figure 6:
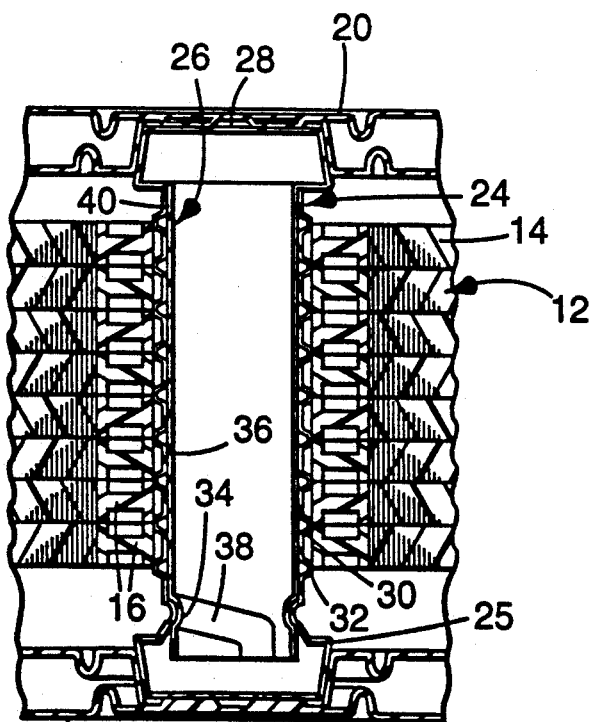
FIG. 6 is a cross-sectional view of the support taken along line 6—6 of FIG. 5.

The support 22 is a spindle or mandrel and can be isolated vibrationally from the container sections. The support can move independently of the remainder of the container 10 to absorb shocks and protect the stored pancakes. Referring to FIGS. 3, 4, and 6, the support 22 is formed of two primary components, a baffled core support 24 with a free end and a head 25 at the other end and an interior rod 26 with a free end and a head 28 at the other end. The heads 25, 28 fit within respective receptacles 19 in the base 18 and the cover 20. The noncircular shape of the heads 25, 28 fit within the receptacles 19 and prevent rotation of the support 22 after the container 10 is assembled. The interior rod 26 fits within the core support 24. These two components can be formed by blow molding a single spindle and cutting the spindle to form the core support 24 and interior rod 26. The baffles 30 can be ribs with some of the baffles extending completely around the core support 24. Alternatively, as shown in FIG. 2, the ribs can be broken. Either some of the ribs can be broken or all can be broken. In the embodiment of FIG. 2, all are broken with the broken portion alternating in circumferential location. The baffle 30 dimensions are selected to permit two pancakes 12 to share a baffle peak 32 when the pancakes are mounted on the core support 24. Thus, each baffle peak 32 will support two adjacent pancake halves.

A nub 34 on the inside surface 36 of the core support 24 engages a spiral groove 38 on the outside surface 40 of the interior rod 26 to provide a threaded engagement between the interior rod 26 and the core support 24. The interior rod 26 can be hand turned and tightened without tools. Other modifications of a threaded engagement between the core support 24 and the interior rod 26 also could be used. For example, two nub 34 and groove 38 pairs could be used.

Rotation of the interior rod 26 within the core support 24 after the nub 34 engages the groove 38, moves the head 28 of the interior rod 26 toward the pancake stack. Further rotation after the head 28 of the interior rod 26 contacts the end of the core support 24 provides an axial compression load onto the core support 24 and therefore onto the pancake cores to hold together the pancakes 12. This axial compression expands the baffles 30. As the baffles 30 expand they contact and tighten against the inside of the tape pancake cores 16 and provide a radial force to secure the pancakes 12 in place.

As shown in FIG. 6, the interior rod head 28 compresses the pancakes on the support 22 by applying a load on substantially only the pancake cores 16. By eliminating pressure on the tape 14 itself, there is no pressure on the tape to force the tape off of the core 16 and cause core drop. The load can be applied to substantially only the outer race of the cores 16 to avoid tipping the pancake 12 on the support 22 due to the lack of contact surface area caused by the clearance between the pancake core and the mandrel. This can be accomplished by forming the inner race of the core 16 of a smaller axial length than the outer race. Alternatively, this can be accomplished by forming the portion of the interior rod head 28 that is disposed adjacent the inner race of the core 16 of a smaller axial length than the radially outer portions of the head that is disposed adjacent and against the outer race of the core.

This system for applying a compression load on pancakes 12 stored on a support 22 can be used in other systems in which one or more objects having a through opening are stored on a mandrel or spindle and the objects are held in place using axial and/or radial compression. Neither the objects nor the mandrel need be cylindrical.

Figure 7:
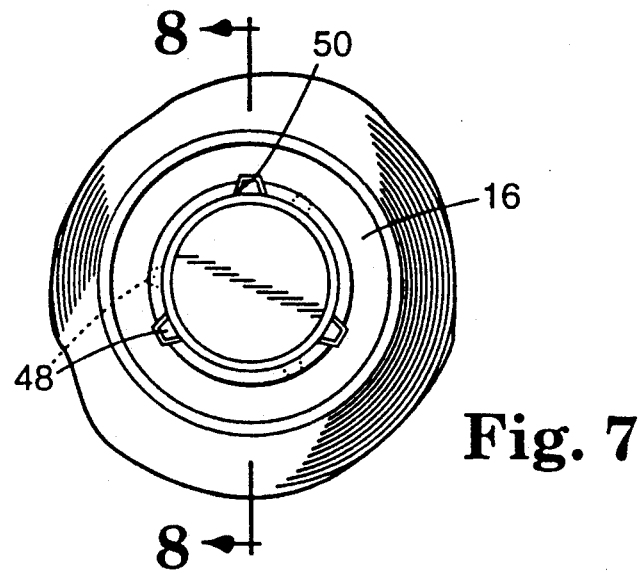
FIG. 7 is an end view of a support according to another embodiment of the present invention.
Figure 8:
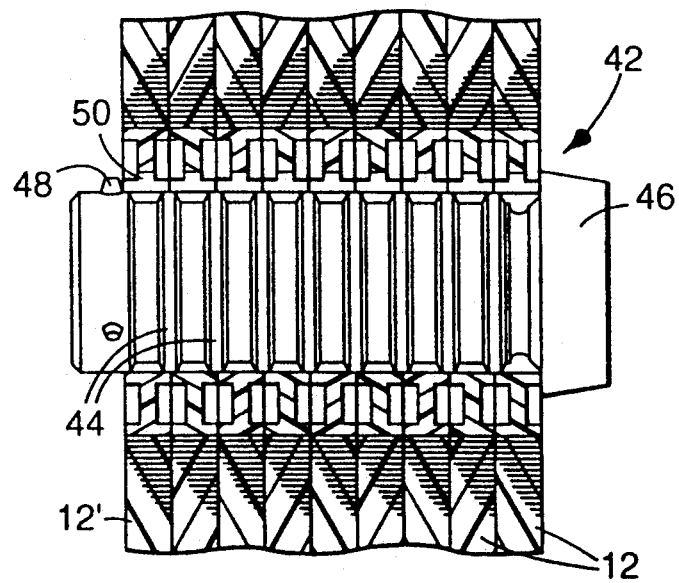
FIG. 8 is a cross-sectional view of a support taken along line 8—8 of FIG. 7.

In an alternative embodiment shown in FIGS. 7 and 8, the support can be an integral one piece support which expands axially to permit locking of the objects on the support. The support 42 includes a baffled core support 44 and a head 46 and can act analogously to an extension spring. The support 42 can be axially expanded and is biased in an axially contracted relaxed or "as molded" state. The core support 44 has three spaced nubs 48 located toward the free end opposite the head. The nubs 48 are sized and spaced at locations corresponding to the channels 50 on a typical pancake core 16 to permit the channels 50 to pass over the nubs 48.

The loading of pancakes 12 onto the support is as follows. In the relaxed state, the length of the core support 44 is less than the length of the stacked pancakes 12 to be stored on the support 42. The core channels 50 are aligned with the nubs 48 and the pancakes 12 are passed over the core support 44 to the head 46. After the last pancake 12 is in place, the core support 44 is stretched to its expanded length which is longer than the stacked pancakes 12 by a distance sufficient to allow the last pancake 12 to be rotated. The last pancake 12' is then rotated so that the nubs 48 do not align with the channels 50. The location of the channels 50 after rotation is shown in broken line in FIG. 7 and the last pancake is shown in FIG. 8 being past the nubs 48. After rotation, the expansion force is removed from the core support 44 and the core support attempts to return to its relaxed state, thereby clamping the pancakes 12. Unclamping is accomplished by reversing the procedure. The expansion force can be provided either with a mechanical fixture or by pneumatic pressure when the support 42 is blow molded.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be affected therein by one skilled in the art without departing from the scope or spirit of the invention.

We claim:

1. A system for securing a plurality of disk-shaped articles having a central opening, comprising:
    a compressible baffled core support on which the articles can be mounted comprising at least one free end;
    an interior rod which fits and is received within the baffled core support, wherein the interior rod comprises means for engaging the free end of the baffled core support; and
    means for compressing the baffled core support to provide an axial compression load on the articles and for radially expanding the baffled core support to provide a radial load on the articles, wherein the compressing and expanding means comprises means for threadedly and rotationally engaging the interior rod within the baffled core support such that rotation of the interior rod within the baffled core support after the interior rod engaging means engages the interior rod within the baffled core support moves the interior rod toward the articles and further rotation after the free end engaging means contacts the end of the baffled core support provides an axial compression load onto the baffled core support and onto the articles to expand the baffles to contact and tighten radially against the inside of the articles to secure the articles in place.

2. The system of claim 1 wherein the free end engaging means comprises a head formed on the end of the interior rod, wherein the head has an outer diameter greater than the outer diameter of the baffled core support to contact and secure the articles.

3. The system of claim 1 wherein the interior rod engaging means comprises a nub formed on the inside surface of the baffled core support and a groove formed on the outside surface of the interior rod, wherein the nub engages the groove.

4. The system of claim 1 wherein the system is receivable within a container.

5. The system of claim 1 wherein the baffle dimensions are selected to permit two articles to share a baffle peak when the articles are mounted on the baffled core support such that each baffle peak will support two adjacent articles.

6. The system of claim 1 wherein the system is made of high density polyethylene without high lubricity to enable frictional locking of the articles.

7. The system of claim 1 wherein the system is made of textured high density polyethylene to enable frictional locking of the articles.

8. The system of claim 1 wherein the baffled core support and the interior rod are formed by blow molding a single mandrel-like component and cutting the component to form the baffled core support and interior rod.

9. The system of claim 1 further comprising a container in which the baffled core support is mountable, wherein the container comprises a receptacle formed in one wall to receive the baffled core support.

10. The storage container of claim 1 wherein the system secures tape pancakes; wherein the free end engaging means comprises a head formed on the end of the interior rod, wherein the head has an outer diameter greater than the outer diameter of the baffled core support to contact and secure the pancakes; and
    wherein the interior rod head compresses the pancakes on the support by applying a load on substantially only the pancake cores.

11. The system of claim 10 wherein the interior rod head has a radially inner portion disposable adjacent the inner race of a pancake core and a radially outer portion disposable adjacent the outer race of the pancake core, and wherein the radially inner portion of the interior rod head that is disposed adjacent the inner race of the core has a smaller axial length to eliminate contact between the interior rod head and the inner race of the pancake core than the radially outer portions of the interior rod head that is disposed adjacent and against the outer race of the core.

12. The system of claim 10 wherein the interior rod engaging means comprises a nub formed on the inside surface of the baffled core support and a groove formed on the outside surface of the interior rod, wherein the nub engages the groove.

13. A system for securing a plurality of stacked pancakes, wherein each pancake is mounted on a core and wherein each core has at least one axial channel, wherein the system comprises:
    an expandable baffled core support on which the pancakes can be mounted comprising a free end, wherein the core support is axially expandable and is biased toward a contracted relaxed state;
    a head formed on the end of the core support opposite the free end, wherein the head has an outer diameter grater than the inner diameter of the pancake cores to contact and secure the articles; and
    at least one nub located toward the free end opposite the head, wherein the nub is sized to correspond to the channel to permit the channel to pass over the nub;
    wherein in the relaxed state the core support length is less than the length of the stacked pancakes and the core channel is aligned with the nub and the pancakes are passed over the core support to the head, wherein after the last pancake is in place on the core support the core support is stretched to its expanded length which is longer than the stacked pancakes by a distance sufficient to allow the last pancake to be rotated so that the nub does not align with the channel, and wherein after rotation, the expansion force is removed from the core support and the core support returns toward its relaxed state, thereby clamping the pancakes.

14. The system of claim 13 wherein each pancake core has three spaced channels and wherein the system comprises three nubs spaced at locations corresponding to those of the channels.

15. The system of claim 13 wherein the system is receivable within a container.

* * * * *